US011892470B1

(12) United States Patent
Salinas

(10) Patent No.: US 11,892,470 B1
(45) Date of Patent: Feb. 6, 2024

(54) CHRONOGRAPH SYSTEM

(71) Applicant: Manuel Salinas, Tempe, AZ (US)

(72) Inventor: Manuel Salinas, Tempe, AZ (US)

( * ) Notice: Subject to any disclaimer, the term of this patent is extended or adjusted under 35 U.S.C. 154(b) by 0 days.

(21) Appl. No.: 17/877,655

(22) Filed: Jul. 29, 2022

Related U.S. Application Data

(60) Provisional application No. 63/227,268, filed on Jul. 29, 2021.

(51) Int. Cl.
*G01P 3/68* (2006.01)
*F41A 21/36* (2006.01)
*F41G 3/14* (2006.01)

(52) U.S. Cl.
CPC ............ *G01P 3/685* (2013.01); *F41A 21/36* (2013.01); *F41G 3/142* (2013.01)

(58) Field of Classification Search
CPC .. F41A 21/36; G01P 3/685; G01P 7/00; F41G 3/142
USPC ......................................................... 42/1.01
See application file for complete search history.

(56) References Cited

U.S. PATENT DOCUMENTS

| 6,260,466 | B1 * | 7/2001 | Humphreys | ............... | F41G 3/08 |
| | | | | | 89/41.06 |
| 8,935,958 | B2 * | 1/2015 | Downing | ................ | G01P 3/665 |
| | | | | | 73/167 |

| 2011/0162245 | A1 * | 7/2011 | Kamal | ..................... | F41C 23/22 |
| | | | | | 42/71.01 |
| 2021/0131765 | A1 * | 5/2021 | Beckman | ................ | F41A 19/59 |

FOREIGN PATENT DOCUMENTS

| GB | 125141 A | * | 6/1916 | | |
| WO | WO-03071286 A2 | * | 8/2003 | .............. | F41A 21/32 |
| WO | WO-2011084852 A1 | * | 7/2011 | .............. | F41B 11/72 |
| WO | WO-2013176595 A1 | * | 11/2013 | .............. | F41A 21/32 |

* cited by examiner

*Primary Examiner* — Samir Abdosh
(74) *Attorney, Agent, or Firm* — BOOTH UDALL FULLER, PLC

(57) ABSTRACT

A chronograph system with a frame, at least two sensors, an accelerometer, and a processor module. The frame is configured to removably couple to a barrel of a firearm. The sensors are attached to the frame and are configured to detect a projectile as the projectile passes each sensor. A first of the sensors may be separated from a second of the sensors by at least three inches. The accelerometer is attached to the frame and configured to track an orientation of the barrel. The processor module is communicatively coupled to the sensors and to the accelerometer and may be configured to receive timestamps from the sensors and the orientation of the barrel from the accelerometer, use the timestamps to determine a velocity of each projectile, and analyze the velocity data and the orientation of the barrel to aid a user in adjusting a scope of the firearm.

19 Claims, 11 Drawing Sheets

CHRONOGRAPH SYSTEM

CROSS REFERENCE TO RELATED APPLICATIONS

This application claims the benefit of the filing date of U.S. Provisional Patent Application 63/227,268 entitled "Accelerometer Chronograph System" to Manuel Salinas that was filed on Jul. 29, 2021, the disclosure of which is hereby incorporated herein by this reference.

TECHNICAL FIELD

Aspects of this document relate generally to a chronograph system, and more specifically to a chronograph system that measures projectile velocity in the muzzle of a firearm.

BACKGROUND

When using firearms such as a rifle or a shotgun, a scope is frequently used to aim the firearm at the desired target. Over short distances, the projectile leaving the firearm is moving fast enough that the user of the firearm does not need to take into account any drop in height experienced by the projectile. However, when shooting over long distances, the drop in height becomes significant, and the user needs to take this drop into account to successfully hit the desired target. It is helpful for the user to know how fast the projectile is traveling to make appropriate adjustments.

SUMMARY

Aspects of this document relate to a chronograph system comprising a frame configured to removably couple to a barrel of a firearm, at least two optical sensors attached to the frame, wherein a first optical sensor of the at least two optical sensors is separated from a second optical sensor of the at least two optical sensors by at least three inches, and wherein each optical sensor is configured to detect a projectile and record a timestamp as the projectile passes each respective optical sensor, an accelerometer attached to the frame and configured to track an orientation of the barrel, a processor module coupled to the frame and communicatively coupled to the at least two optical sensors and to the accelerometer, and a mobile computing device configured to communicatively couple to the processor module, wherein the processor module is configured to receive timestamps from the at least two optical sensors and the orientation of the barrel from the accelerometer, use the timestamps corresponding with each projectile to determine a velocity of each projectile, and send velocity data regarding the velocity of each projectile and the orientation of the barrel to the mobile computing device, and wherein the mobile computing device is configured to receive the velocity data and the orientation of the barrel from the processor module, display the velocity data to a user of the firearm, and analyze the velocity data and the orientation of the barrel to aid the user in adjusting a scope of the firearm.

Particular embodiments may comprise one or more of the following features. The chronograph system may further comprise a heat sensor coupled to the frame and configured to gather temperature data about the barrel, wherein the mobile computing device is configured to use the temperature data to aid the user in adjusting the scope of the firearm. The chronograph system may further comprise a counter configured to record a number of activations of the firearm. The frame may comprise a muzzle brake configured to decrease a recoil of the firearm after an activation of the firearm. The frame may be configured to threadedly couple with the barrel of the firearm.

Aspects of this document relate to a chronograph system comprising a frame configured to removably couple to a barrel of a firearm, at least two sensors attached to the frame, wherein a first sensor of the at least two sensors is separated from a second sensor of the at least two sensors and each sensor of the at least two sensors is configured to detect a projectile and record a timestamp as the projectile passes each respective sensor, an accelerometer attached to the frame and configured to track an orientation of the barrel, and a processor module coupled to the frame and communicatively coupled to the at least two sensors and to the accelerometer, wherein the processor module is configured to receive timestamps from the at least two sensors and the orientation of the barrel from the accelerometer use the timestamps corresponding with each projectile to determine a velocity of each projectile, and analyze velocity data based on the velocity of each projectile and the orientation of the barrel to aid a user of the firearm in adjusting a scope of the firearm.

Particular embodiments may comprise one or more of the following features. The at least two sensors may be optical sensors. The first sensor of the at least two sensors may be separated from the second sensor of the at least two sensors by at least three inches. The accelerometer may be configured to automatically turn on the chronograph system when a movement of the chronograph system is detected and automatically turn off the chronograph system when no movement of the chronograph system is detected over a predetermined length of time. The frame may comprise a muzzle brake configured to decrease a recoil of the firearm after an activation of the firearm. The frame may be configured to threadedly couple with the barrel of the firearm.

Aspects of this document relate to a chronograph system comprising a frame configured to removably couple to a barrel of a firearm, at least two sensors attached to the frame, wherein each sensor of the at least two sensors is configured to detect a projectile as the projectile passes each respective sensor, and a processor module coupled to the frame and communicatively coupled to the at least two sensors, wherein the processor module is configured to receive data regarding each projectile from the at least two sensors, and use the data corresponding with each projectile to determine a velocity of each projectile and create velocity data based on the velocity of each projectile. The chronograph system may further comprise a mobile computing device configured to communicatively couple to the processor module and display the velocity data to a user of the firearm. The frame may be configured to threadedly couple with the barrel of the firearm. The chronograph system may be configured to analyze the velocity data to aid a user of the firearm in adjusting a scope of the firearm. A first sensor of the at least two sensors may be separated from a second sensor of the at least two sensors by at least three inches. The at least two sensors may be optical sensors. The chronograph system may further comprise an accelerometer attached to the frame and configured to track an orientation of the barrel. The orientation of the barrel may be used in conjunction with the velocity data to aid a user of the firearm in adjusting a scope of the firearm. The accelerometer may be configured to automatically turn on the chronograph system when a movement of the chronograph system is detected and automatically turn off the chronograph system when no movement of the chronograph system is detected over a predetermined length of time.

Particular embodiments may comprise one or more of the following features.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
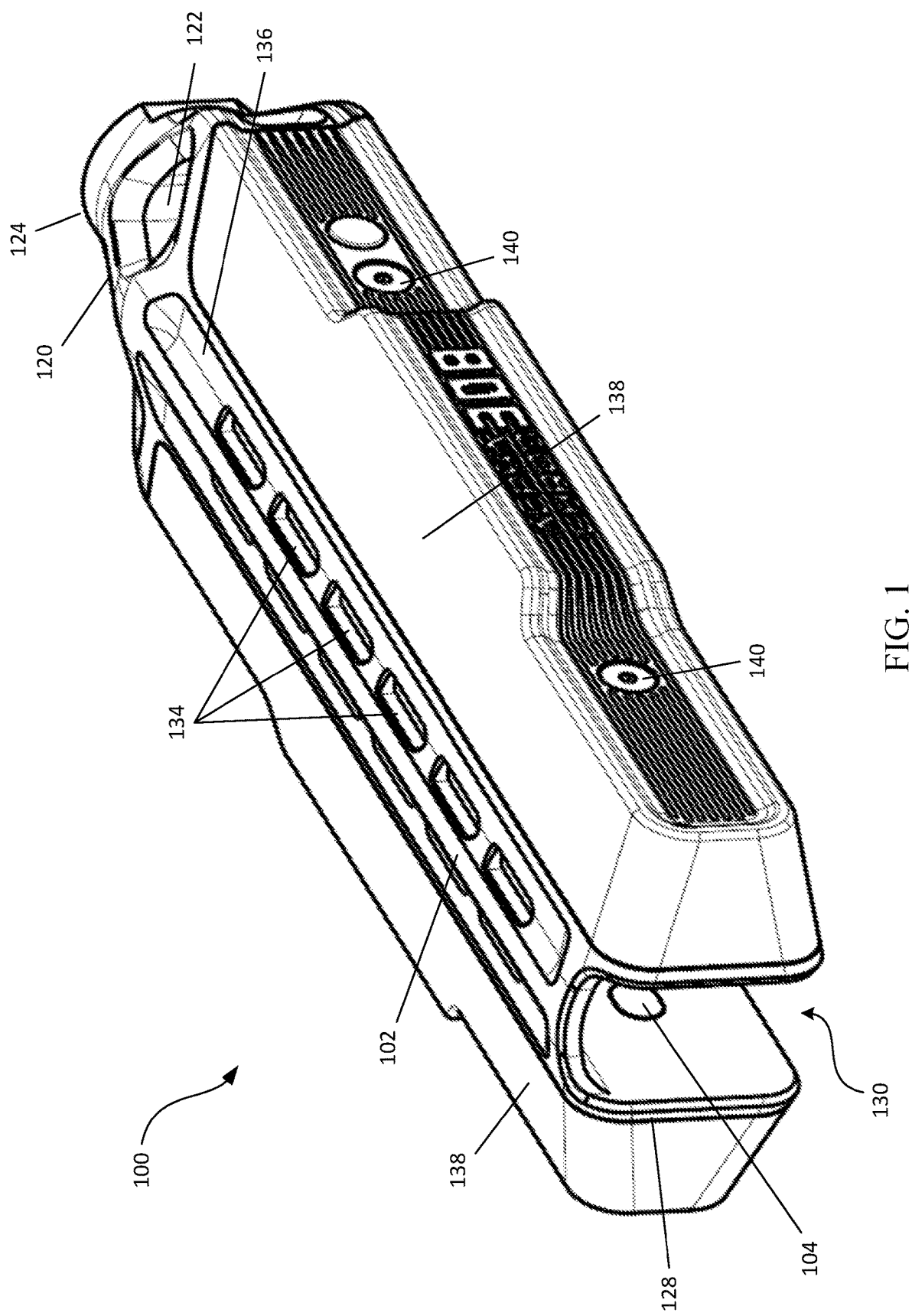
FIG. 1 is a front perspective view of a chronograph system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 2A:
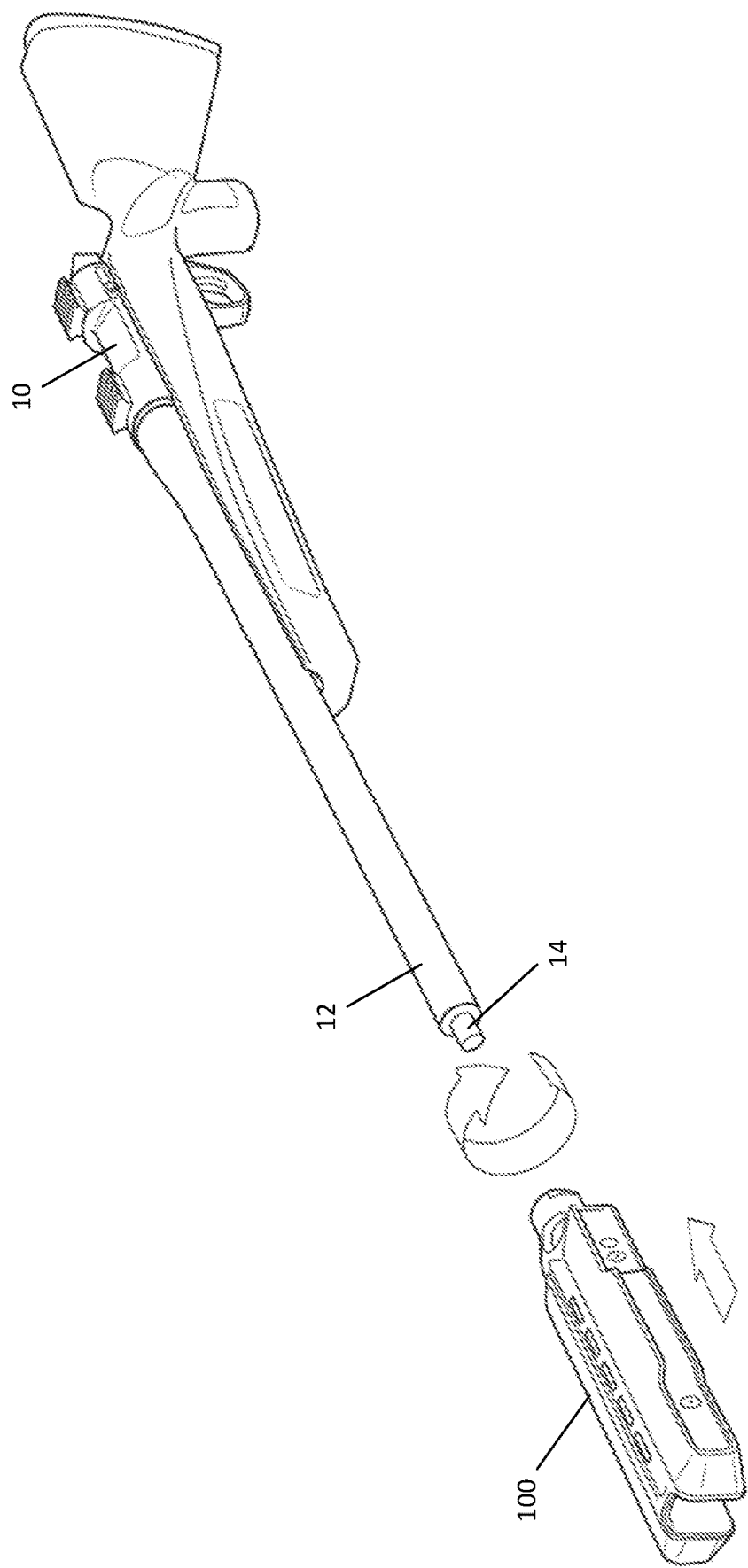
FIG. 2A is a perspective view of the chronograph system shown in FIG. 1, illustrating how the chronograph system may be installed onto a firearm.
Figure 2B:
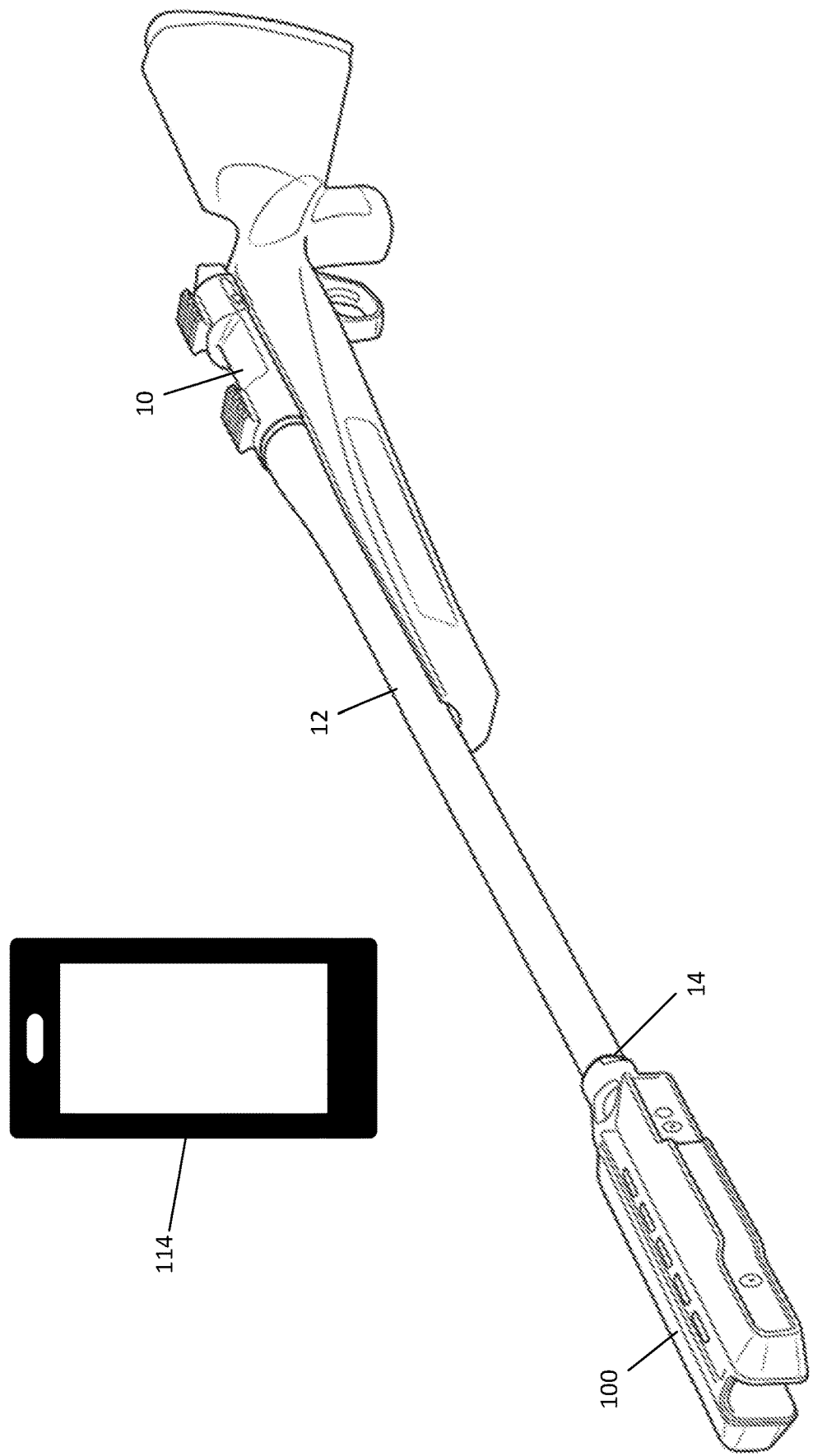
FIG. 2B is a perspective view of the chronograph system shown in FIG. 1 installed on the firearm.
Figure 3:
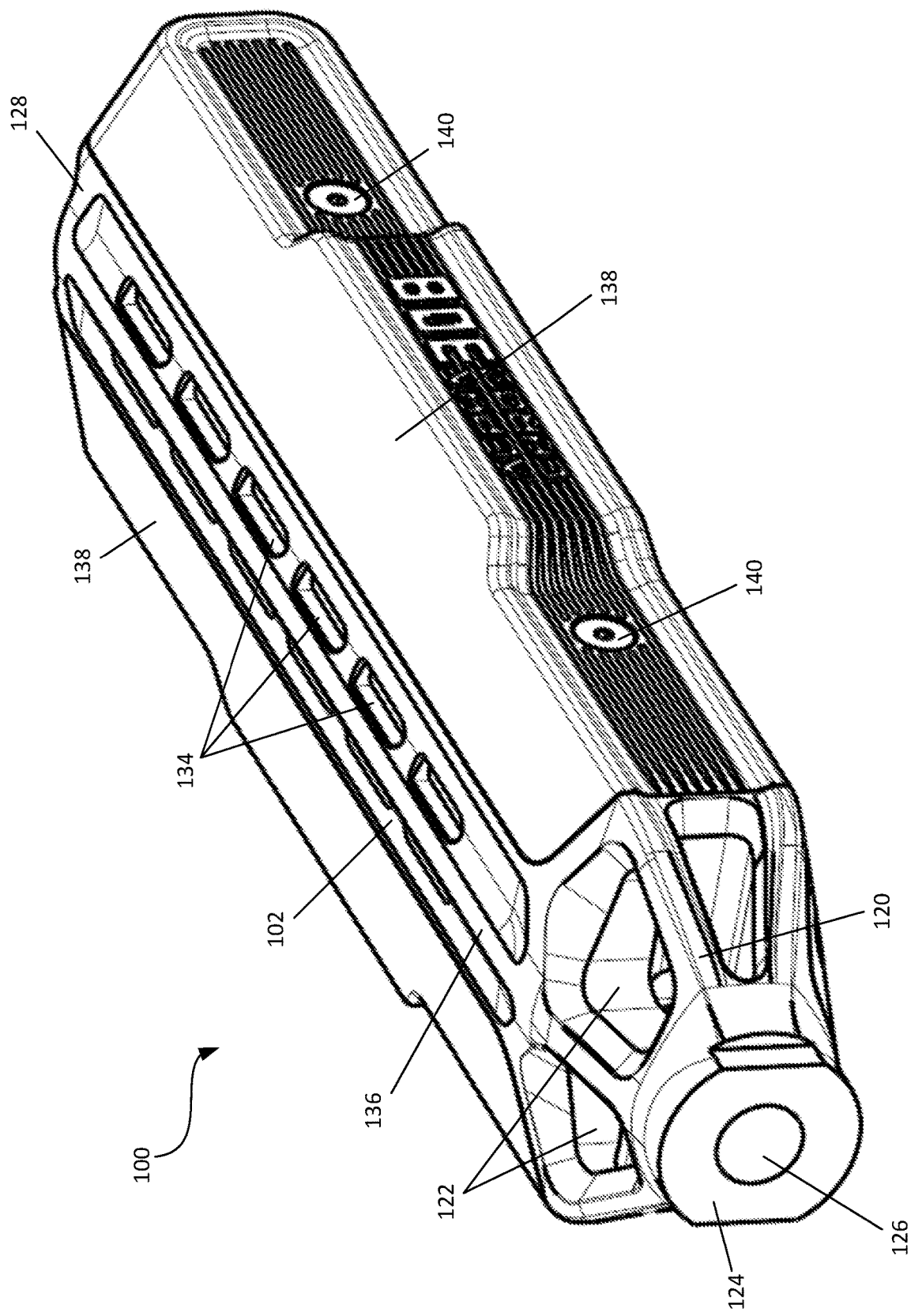
FIG. 3 is a back perspective view of the chronograph system shown in FIG. 1.

The present disclosure is related to a chronograph system 100 that is configured to collect data regarding the velocity of each projectile fired by a firearm 10. This data can then be used to estimate the velocity of future projectiles exiting the firearm 10, allowing the user to properly account for the drop of the projectile during flight. As shown in FIGS. 1-10, the chronograph system 100 may comprise a frame 102, at least two sensors 104, an accelerometer 106, and/or a processor module 108. The frame 102 provides support for the other components of the chronograph system 100 and is configured to removably couple to the barrel 12 of the firearm 10, as shown in FIGS. 2A and 2B. In some embodiments, the frame 102 may be configured to threadedly couple with the barrel 12 of the firearm 10. For example, as specifically shown in FIG. 2A, the frame 102 may be configured to screw onto an end 14 of the barrel 12. In some embodiments, the frame 102 may be configured to snap or clamp onto the barrel 12.

The frame 102 may attach to the barrel 12 using other methods as well. For example, the frame 102 may be somewhat flexible and may include at least one fastener to facilitate coupling the frame 102 to the muzzle end 14 of the barrel 12, though a fastener may not be required in all implementations. Alternatively, for example, the frame 102 may be penannular in cross-section (or incomplete along one side) and flexible enough to be spread apart slightly and slip fit over or otherwise manipulated onto the muzzle end 14 of the barrel 12, or any location of the barrel, with or without a fastener to then clamp into position.

The sensors 104 are attached to the frame 102 and each sensor 104 is configured to detect the projectile as the projectile passes each respective sensor 104. The sensors 104 may each be an optical sensor, such as a laser optic sensor. Thus, each sensor 104 may emit a light, whether visible or outside the visible spectrum, across a path of the projectile toward a receiver. When the receiver senses that the light has been interrupted, the sensor 104 notes this interruption as a projectile having passed the sensor 104. The sensor 104 may record a timestamp to indicate a time at which a projectile passed the sensor 104. The sensors 104 may be spaced out or separated. This allows an amount of time to pass between when a projectile passes a first sensor 110 and a second sensor 112 of the at least two sensors 104. The first sensor 110 and the second sensor 112 may be separated by at least 1 inch, 2 inches or 3 inches. Larger distances may also be used, such as at least 4 inches, 5 inches, or 6 inches. Because the distance between the first sensor 110 and the second sensor 112 is known, the timestamps taken for a particular projectile by the first sensor 110 and the second sensor 112 can be used in conjunction with the distance between the first sensor 110 and the second sensor 112 to calculate an average velocity of the projectile as it travels between the first sensor 110 and the second sensor 112. As a result, larger distances between the first sensor 110 and the second sensor 112 may be beneficial because this helps to minimize the effect of timing errors in sensing the projectile due to the larger amount of time that the projectile spends between the first sensor 110 and the second sensor 112.

The accelerometer 106 may be attached to the frame 102 and is configured to track an orientation of the barrel 12. Knowing the orientation of the barrel 12 helps to determine how much the projectile will drop during flight. For example, if the user of the firearm 10 activates the firearm 10 when the barrel 12 is at a positive upward angle of even just five degrees, the trajectory of the projectile changes, and the drop of the projectile over the course of the projectile's flight is therefore also different. The accelerometer 106 aids the user in taking this difference into account by providing data regarding the orientation of the barrel 12. Additionally, the accelerometer 106 may be configured to automatically turn the chronograph system 100 on and off. For example, when the firearm 10 is not in use, it is generally stationary, which the accelerometer 106 can sense. When the user lifts up the firearm 10 to use it, the accelerometer 106 may be configured to sense this motion, and turn on, or wake up, the remaining components of the chronograph system 100. Similarly, the accelerometer 106 may be configured to sense when the chronograph system 100 has not been moved for a predetermined length of time, such as after 3 minutes or 5 minutes. The accelerometer 106 may be configured to automatically turn off the chronograph system 100 when no movement is detected over the predetermined length of time. This may help to save battery life by not constantly running the other components, such as the sensors 104.

The processor module 108 receives and processes data from the sensors 104 and/or the accelerometer 106 to produce projectile velocity at the muzzle end 14 of the barrel 12. The components described here, their connections, couples, and relationships, and their functions, are meant to be exemplary only, and are not meant to limit the implementations described, according to one implementation.

Figure 4:
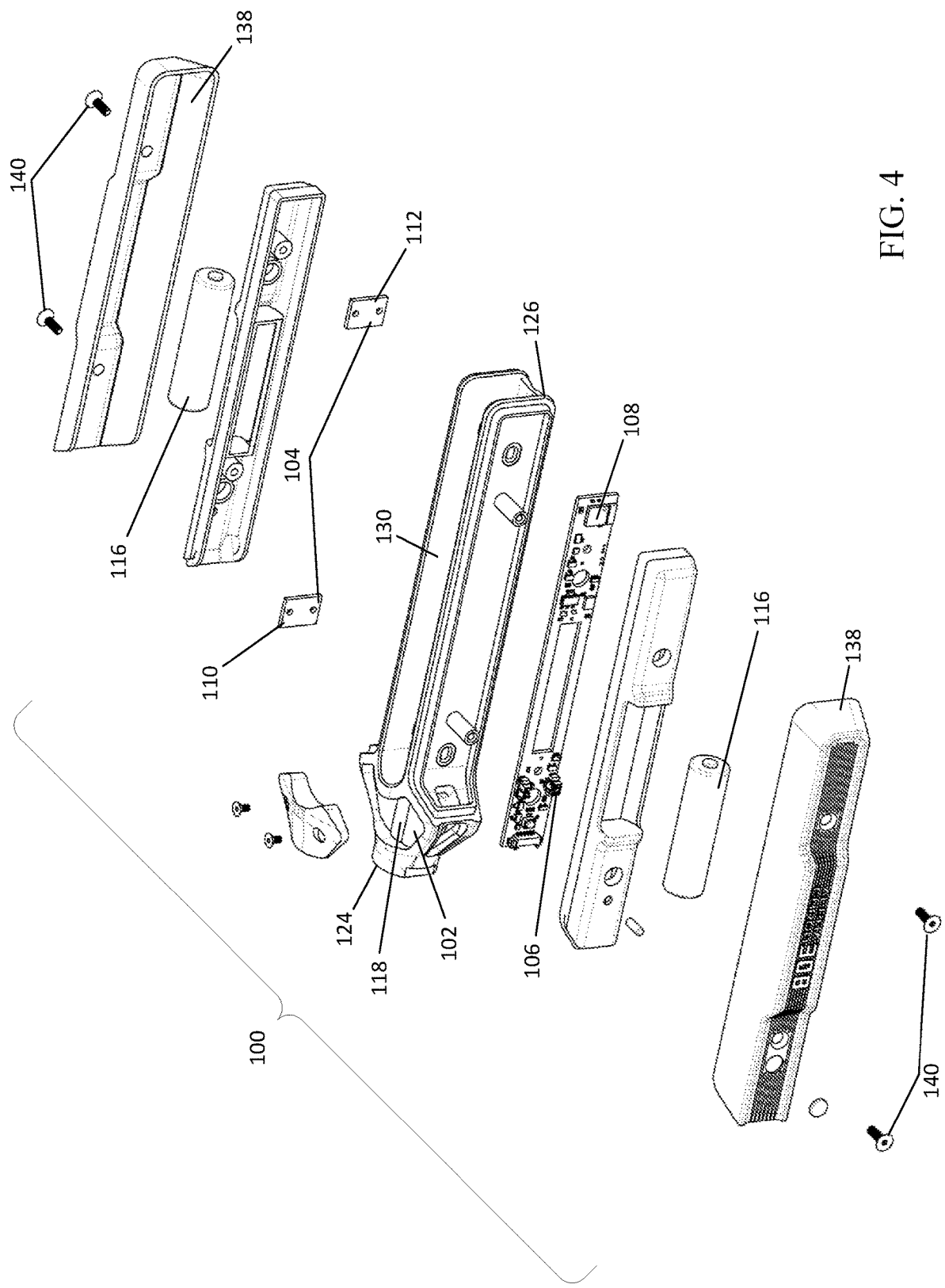
FIG. 4 is an exploded view of the chronograph system shown in FIG. 1.
Figure 5:
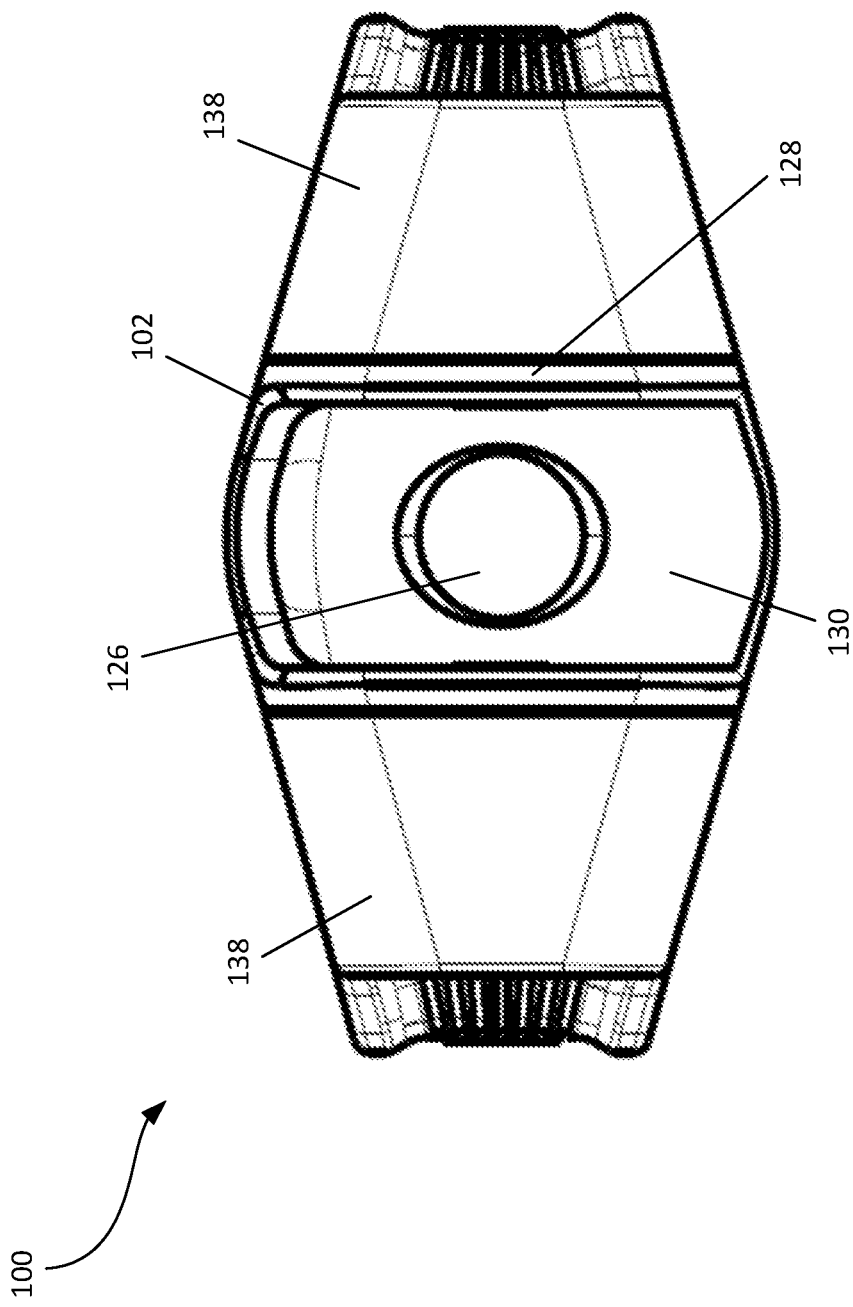
FIG. 5 is a front view of the chronograph system shown in FIG. 1.
Figure 6:
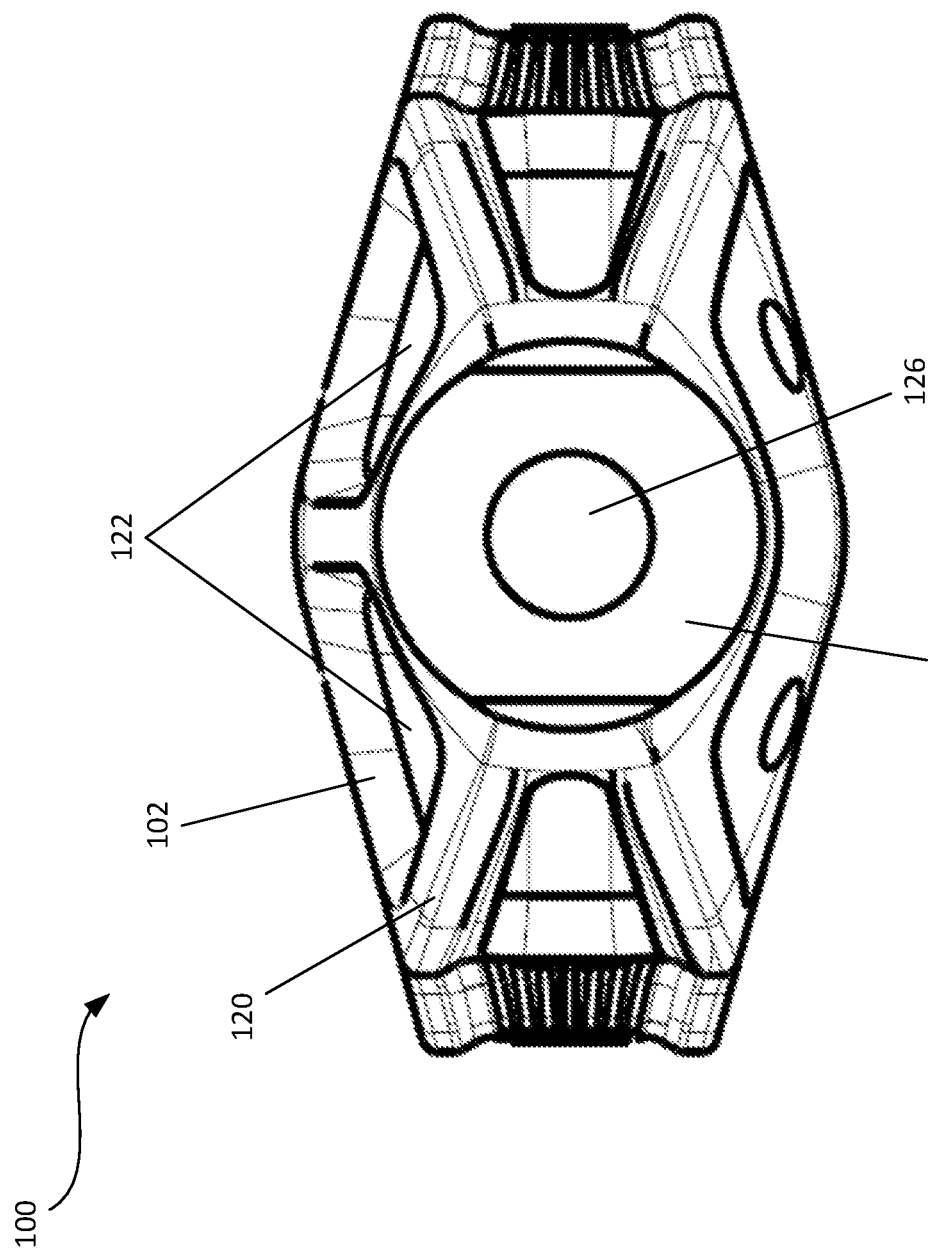
FIG. 6 is a back view of the chronograph system shown in FIG. 1.
Figure 7:
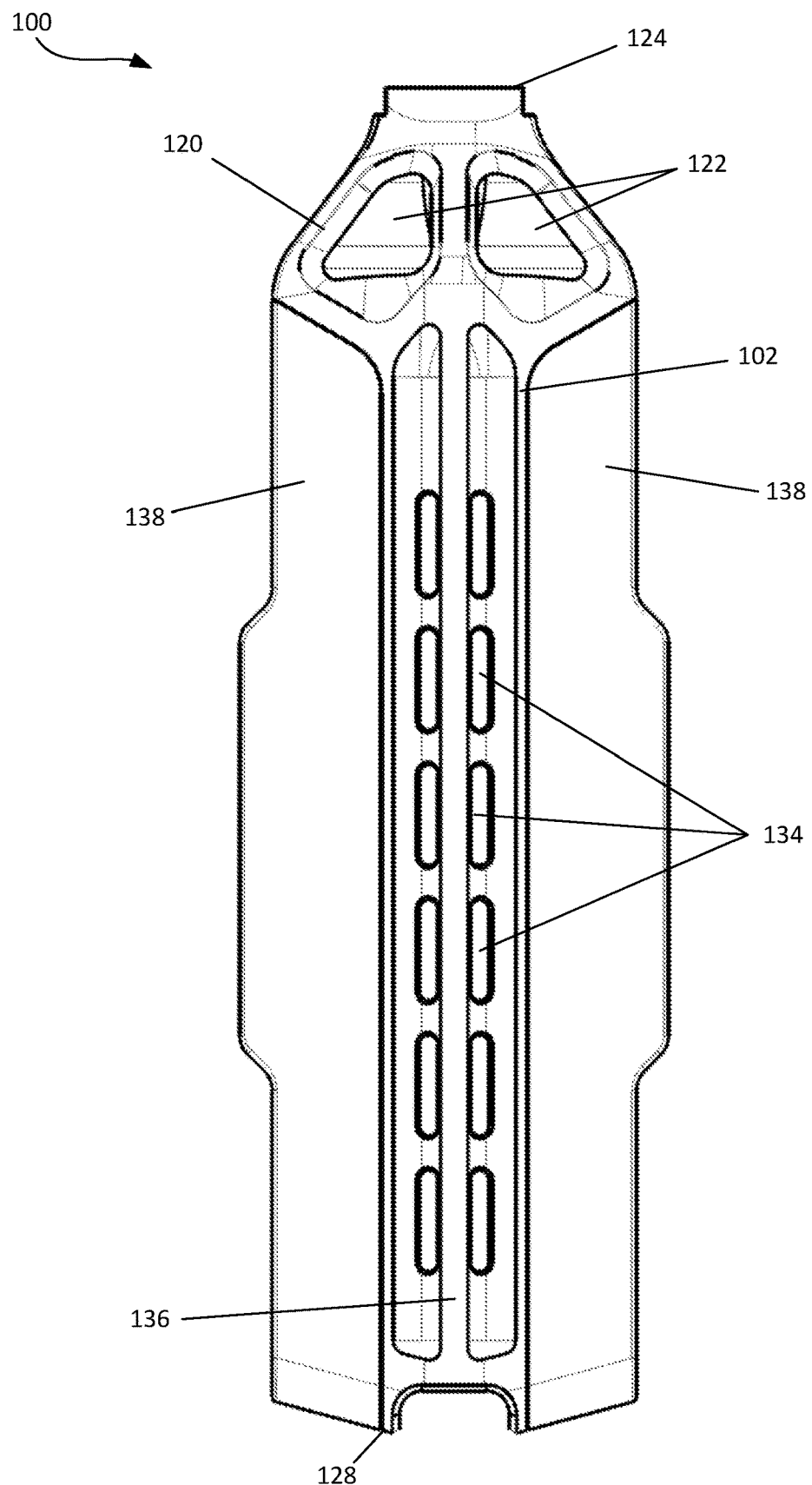
FIG. 7 is a top view of the chronograph system shown in FIG. 1.
Figure 8:
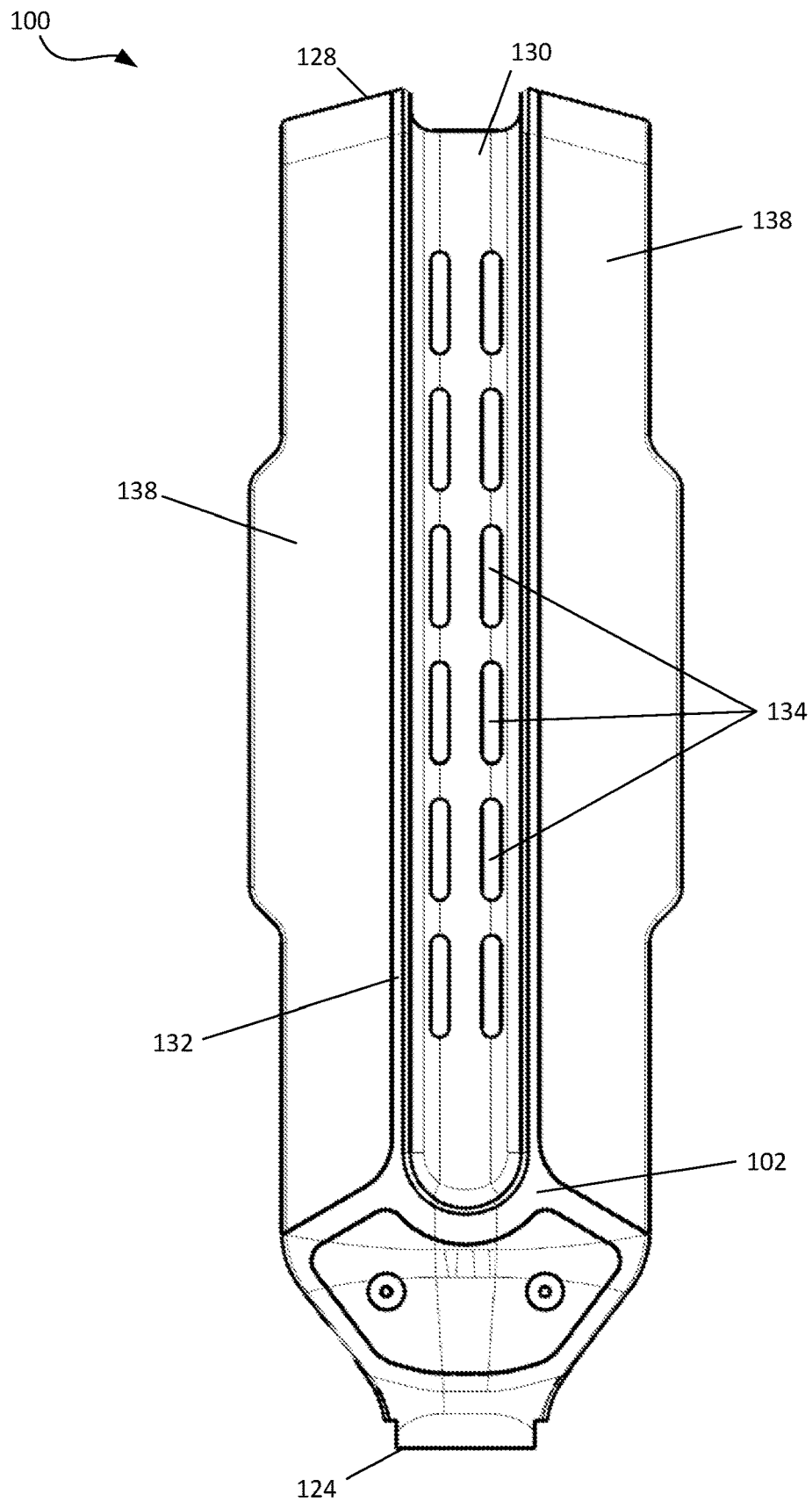
FIG. 8 is a bottom view of the chronograph system shown in FIG. 1.
Figure 9:
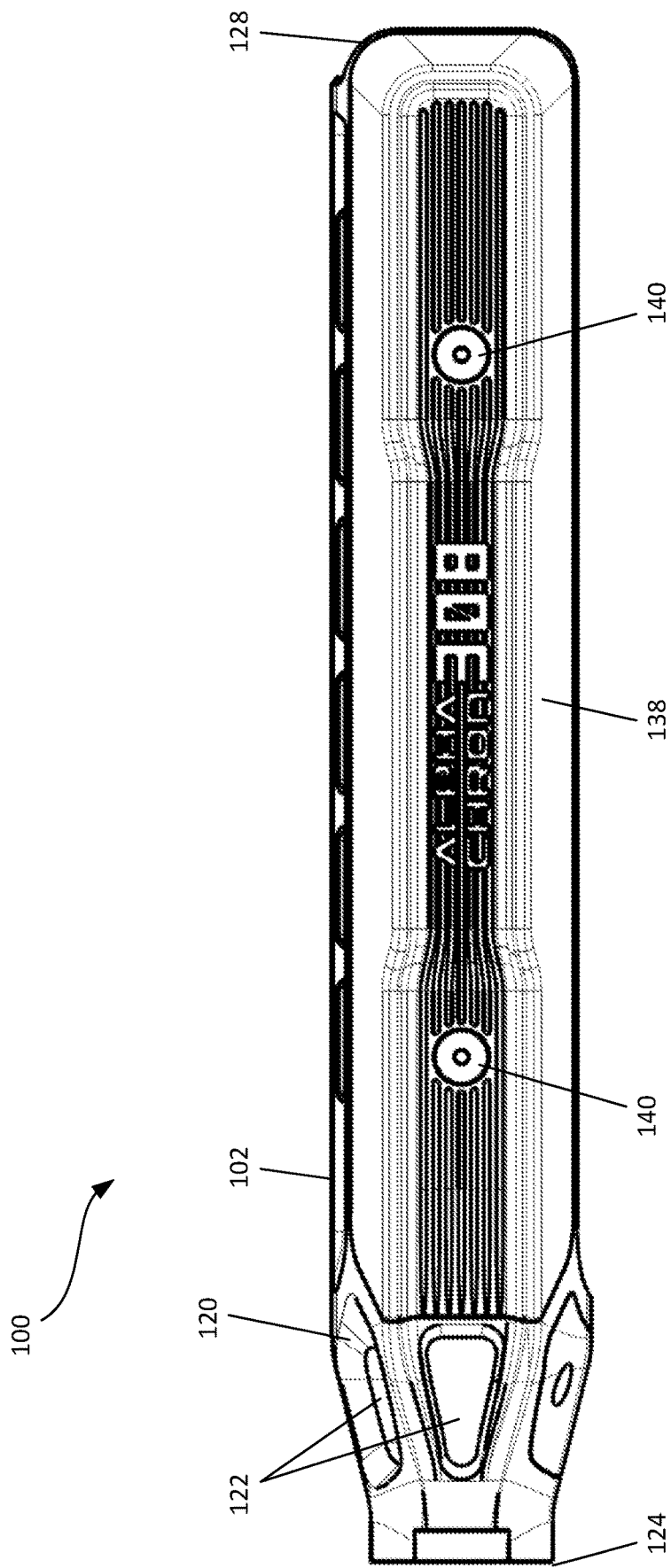
FIG. 9 is a left view of the chronograph system shown in FIG. 1.
Figure 10:
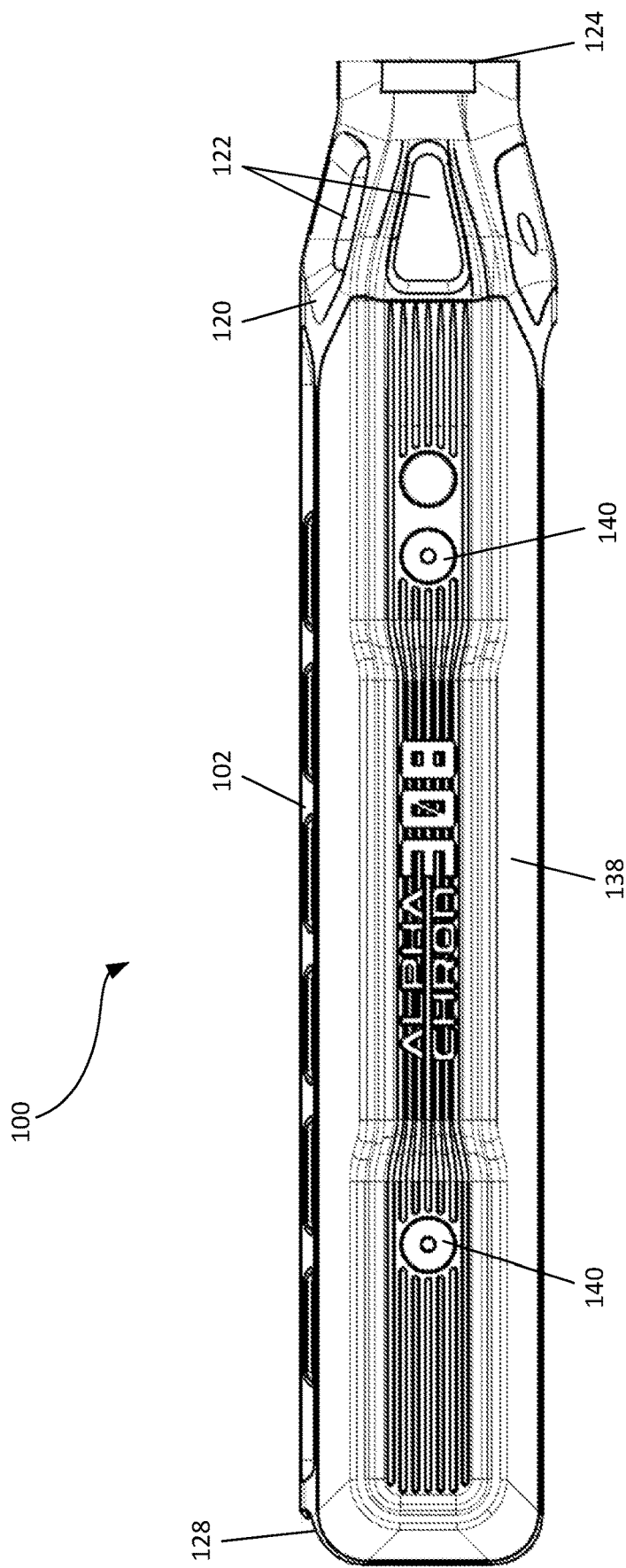
FIG. 10 is a right view of the chronograph system shown in FIG. 1.

The processor module 108 is a circuit with a memory and processing capabilities, and may be housed on a printed circuit board, as shown in FIG. 4. The processor module 108 is coupled to the frame 102 and is communicatively coupled to the sensors 104 and/or the accelerometer 106. This allows the processor module 108 to communicate with the sensors 104 and the accelerometer 106 and receive data from each of these components. Thus, the processor module 108 may be configured to receive timestamps or other data from the sensors 104 and receive the orientation of the barrel 12 from the accelerometer 106. The sensors 104 may be configured to send this data to the processor module 108 each time an activation of the firearm 10 is detected. Similarly, the accelerometer 106 may be configured to send data regarding the orientation of the firearm 10 to the processor module 108 each time an activation of the firearm 10 is detected.

The processor module 108 may also be configured to use the timestamps or other data corresponding with each projectile to determine a velocity of each projectile. This allows the user to know what the velocities are for each projectile in the exact circumstances that are currently present for the user. This improves the accuracy of the estimate for the next projectile. In some embodiments, the processor module 108 is also configured to create velocity data from the calculated velocities and analyze the velocity data and/or the orientation of the barrel 12 to aid the user of the firearm 10 in adjusting the scope of the firearm 10. For example, the processor module 108 may perform various calculations to be able to suggest how the scope should be adjusted to improve the accuracy of the shots being fired. Additionally, in some embodiments, the scope may be operatively coupled to the processor module 108, allowing the processor module 108 to communicate what adjustments should be made directly to the scope. The scope may then automatically make these adjustments for the user.

The processor module 108 includes a mobile compatible memory, a communication interface, and a transceiver, among other components. In one implementation, the components indicated herein are inter-coupled using various buses, and several or all of the components may be mounted on a common motherboard.

The processor module 108 may execute instructions, including instructions stored in the mobile compatible memory, such as determining/calculating projectile velocity as described more fully below. The processor module 108 may be implemented as a chipset of chips that include separate and multiple analog and digital processors. The processor module 108 may provide, for example, for coordination of the other components, such as control of sensors, applications, and wireless communication.

An external interface may be provided in communication with the processor module 108 to enable near area communication of the processor module with a mobile computing device 114 to send data, such as the sensor and projectile velocity data. The external interface may provide, for example, for wired communication in some implementations, or for wireless communication in other implementations, and multiple interfaces may also be used.

The chronograph system 100 may also comprise a mobile computing device 114 configured to communicatively couple to the processor module 108. The mobile compatible memory 114 may be implemented as a volatile memory (e.g. a flash memory) and a non-volatile memory (e.g., a non-volatile random-access memory ("NVRAM")). The mobile compatible memory 114 may comprise instructions to carry out the processes described herein. In one implementation, a computer program or application comprises a set of instructions that, when executed, perform one or more methods, such as determining/calculating projectile velocity as described more fully below. The set of instructions, a dataset containing relevant information, for example a table of compensation factors created for the different caliber and barrel designs, and the like may be stored on the mobile compatible memory and/or a propagated signal that may be received, for example, over the transceiver and/or the external interface.

The processor module 108 may communicate wirelessly through the communication interface, which may be comprised of a digital signal processing circuitry. The communication interface may provide for communications using various modes and/or protocols, such as a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver (e.g., radio-frequency transceiver). In addition, short-range communication may occur, such as using a Bluetooth®, Wi-Fi, and/or other such transceiver. In addition, a GPS ("Global Positioning System") receiver module may provide additional navigation-related and location-related wireless data to the specific mobile computing device 114, which may be used as appropriate by a software application running on the specific mobile computing device 114.

The mobile computing device 114 can display and analyze the sensor and projectile velocity data for a user of the firearm 10. The mobile computing device 114 may represent various forms of mobile devices, such as smartphones, camera phones, personal digital assistants, cellular telephones, tablets, smart watches, and other similar mobile devices. The components described here, their connections, couples, and relationships, and their functions, are meant to be exemplary only, and are not meant to limit the implementations described, according to one implementation.

In one implementation, a specific mobile computing device 114 may include a mobile compatible processor, a mobile compatible memory, and an input/output device such as a mobile display, a communication interface, and a transceiver, among other components. The specific mobile computing device 114 may also be provided with a storage device, such as a microdrive or other device, to provide additional storage. In one implementation, the components indicated heretofore are inter-coupled using various buses, and several of the components may be mounted on a common motherboard. The mobile computing device 114 may have many electrical components and communicative capabilities that are similar to the processor module 108 as described above.

The mobile computing device 114 may provide the user with controls for controlling the chronograph system 100. For example, the mobile computing device 114 may be a smartphone with an app which the user can access to turn the chronograph system 100 on or off, as well as view the data gathered by the chronograph system 100. The processor module 108 may be configured to send the velocity data and the orientation of the barrel 12 to the mobile computing device 114 and the mobile computing device 114 may be configured to receive the velocity data and/or the orientation of the barrel 12 from the processor module 108. Similar to the processor module 108, in some embodiments, the mobile computing device 114 is configured to create velocity data from the calculated velocities and analyze the velocity data and/or the orientation of the barrel 12 to aid the user of the firearm 10 in adjusting the scope of the firearm 10. For example, the mobile computing device 114 may perform various calculations to be able to suggest how the scope should be adjusted to improve the accuracy of the shots being fired. Additionally, in some embodiments, the scope may be operatively coupled to mobile computing device 114, allowing mobile computing device 114 to communicate what adjustments should be made directly to the scope. The scope may then automatically make these adjustments for the user. The mobile computing device 114 may also be configured to display the velocity data to the user of the firearm 10, such as through the screen of the smartphone if the mobile computing device 114 is a smartphone.

In some embodiments, chronograph system 100 may not be a standalone unit. Instead, the sensor 104 and the processor module 108 may be part of or embodied, contained, incorporated, included, integrated, and the like into a muzzle device that can be attached to the end 14 of the barrel 12, such as a muzzle brake, flash hider, suppressor, tamer, tuner, and the like, as will be disclosed in more detail below.

Additionally, the chronograph system 100 may include different or additional sensors 104, such as inductive and optical sensors to trigger on the projectile exiting the barrel 12 and heat sensors measuring ambient temperature and barrel heat, etc.

The chronograph system 100 may have at least one battery 116, as shown in FIG. 4. The battery may be configured to provide power to each of the powered components of the chronograph system 100, such as the sensors 104, the accelerometer 106, and the processor module 108. Additionally, the chronograph system 100 may have a counter that is configured to record a number of activations of the firearm 10.

The chronograph system 100 may also have a heat sensor 118 coupled to the frame 102. The heat sensor 118 may be configured to gather temperature data about the barrel 12 and send the temperature data to the processor module 108 or the mobile computing device 114. The temperature data may then be used to aid the user in adjusting the scope of the firearm 10. The temperature of the barrel 12 is relevant because of the effect it has on the velocity of the projectiles moving through the barrel 12. Thus, the processor module 108 and/or the mobile computing device 114 may be configured to use the temperature data to aid the user in adjusting the scope of the firearm 10.

The frame 102 may be formed with a muzzle brake 120 integrated into the frame 102. The muzzle brake 120 is configured to decrease a recoil of the firearm 10 after an activation of the firearm 10. As is known in the art, this is accomplished by redirecting a portion of the propellant gases which exit the barrel 12 of the firearm 10 behind the projectile so that they exert a force on the barrel 12 which counteracts the recoil of the firearm 10. Thus, the muzzle brake 120 may have at least one vent port 122 which is configured to direct the propellant gases in the desired direction to counter the recoil of the firearm 10.

The frame 102 may comprise a first end 124 that is configured to couple to the muzzle end 14 of the barrel 12. The first end 124 may have a hole 126 extending therethrough which allows projectiles to exit the barrel when the chronograph system 100 is attached to the firearm 10. The frame 102 also has a second end 128 distal to the first end 124 and a channel 130 that extends between the second end 128 and the hole 126 through the first end 124. The channel 130 may be open on a bottom side 132 of the frame 102 and may have gas vents 134 on a top side 136 of the frame 102. The frame 102 may also have at least one housing 138 configured to protect the sensors 104 and other components from the environment surrounding the chronograph system 100. The housing 138 may be attached to the frame 102 with a plurality of screws 140. Alternatively, the housing 138 may be configured to snap on the frame 102 or attach to the frame 102 in some other way.

The components described herein may also be combined into a system which does not include a chronograph. For example, a muzzle device could be built which comprises a muzzle brake 120 and a counter, or a suppressor and a counter. Any combination of the following components could be implemented: a chronograph, a counter, a heat sensor, a muzzle brake, a flash hider, a suppressor, a tamer, and/or a tuner, etc.

In some embodiments of the chronograph system 100, the sensor 104 may be an electronics device which measures high speed vibrations in the barrel 12 and/or low speed movement of the firearm 10 from recoil. For example, an accelerometer may be used as the sensor 104. When mounted on the barrel 12, the sensor 104 may thus measure high frequency vibrations in the barrel 12 as a round is fired and is propagating down the barrel 12.

For the exemplary purposes of this disclosure, operation of a chronograph system 100 using an accelerometer as the sensor 104 in conjunction with a bolt action rifle may be as follows.

A sensor 104 mounted at or near the muzzle of the rifle will measure high frequency vibrations in the steel barrel as a round is fired and propagating down the barrel 12. The moment the primer is struck and the round is detonated, a powerful shock from the gunpowder charge is created and that shock travels through the steel barrel at about 19,030 ft/sec. On a 24" barrel length, the sensor 104 will measure the detonation 105 us later and will trigger a time stamp. Then when the bullet passes the sensor 104 and leaves the muzzle end 14 of the barrel 12, there will be a response from the sensor 104 triggering a time stamp. The high-speed sensor 104 will measure the timing of the initial detonation and the bullet leaving the barrel 12, and then the processor 108 can calculate the velocity by:

Lb—is the barrel length in inches from chambered bullet center mass to the rifle muzzle. f—is a barrel compensation factor specific to each caliber and barrel design. Vs—is the Velocity of sound in steel=228,360 in/sec (19,030 ft/sec).

Td—is the compensated time of detonation in seconds. The propagation delay is subtracted from the measured trigger time stamp (Ts) to provide the true time of detonation. Td=Ts−(Lb/Vs).

Tm—is the time the bullet passes the muzzle sensor in seconds, as triggered by the sensor.

Lbf—is the barrel length in inches with a compensation factor specific to each caliber and barrel design.

$$\text{Velocity [in/sec]} = Lbf/(Tm-Td)$$

After the shooter pulls the trigger and the round is set off, the resulting explosion of gunpowder will start to drive the bullet down the length of the barrel. This explosion of gunpowder creates a shock wave in the steel barrel which propagates down the barrel at a known constant rate to the sensor which time stamps the event, and the processor subtracts the propagation delay time from the time stamp to determine the moment the round was detonated. The time of detonation (Td)=Time Stamp−(Barrel Length (Lb)/Velocity of sound in steel (Vs)).

The bullet continues to accelerate under the pressure of the gunpowder charge down the barrel. When the bullet passes the sensor and leaves the muzzle, the sensor triggers and captures another time stamp.

Different barrel lengths and different calibers of bullets will have different characteristics of acceleration. For this reason, a table of compensation factors may be created for the different caliber and barrel designs, and this compensation factor is selected to match the caliber and barrel being used.

For example, if a rifle has a 26" barrel, chambered in .308 Winchester, the compensation factor may be 1.263. So, the compensated barrel length Lbf is 26"*1.263=32.838. Then when a shot is taken, a (Tm−Td) measurement of 995 us will result in a velocity reading of 32.838 in/995 us=33,033 inches per second, or 2750 feet per second muzzle velocity. If the (Tm−Td) time is 990 us, the velocity is 2764 fps.

It will be understood that implementations of a chronograph system are not limited to the specific assemblies, devices and components disclosed in this document, as virtually any assemblies, devices and components consistent with the intended operation of a chronograph system may be used. Accordingly, for example, although particular chronograph systems, and other assemblies, devices and components are disclosed, such may include any shape, size, style, type, model, version, class, measurement, concentration, material, weight, quantity, and/or the like consistent with the intended operation of chronograph systems. Implementations are not limited to uses of any specific assemblies, devices and components; provided that the assemblies, devices and components selected are consistent with the intended operation of a chronograph system.

Accordingly, the components defining any chronograph system may be formed of any of many different types of materials or combinations thereof that can readily be formed into shaped objects provided that the materials selected are consistent with the intended operation of a chronograph system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various chronograph systems may be manufactured using conventional procedures as added to and improved upon through the procedures described here. Some components defining a chronograph system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling chronograph systems are not limited to the specific order of steps as disclosed in this document. Any steps or sequence of steps of the assembly of a chronograph system indicated herein are given as examples of possible steps or sequence of steps and not as limitations, since various assembly processes and sequences of steps may be used to assemble chronograph systems.

The implementations of a chronograph system described are by way of example or explanation and not by way of limitation. Rather, any description relating to the foregoing is for the exemplary purposes of this disclosure, and implementations may also be used with similar results for a variety of other applications employing a chronograph system.

What is claimed is:

1. A chronograph system, comprising:
   a frame configured to removably couple to a barrel of a firearm;
   at least two optical sensors attached to the frame, wherein a first optical sensor of the at least two optical sensors is separated from a second optical sensor of the at least two optical sensors by at least three inches, and wherein each optical sensor is configured to detect a projectile and record a timestamp as the projectile passes each respective optical sensor;
   an accelerometer attached to the frame and configured to track an orientation of the barrel;
   a processor module coupled to the frame and communicatively coupled to the at least two optical sensors and to the accelerometer; and
   a mobile computing device configured to communicatively couple to the processor module;
   wherein the processor module is configured to:
      receive timestamps from the at least two optical sensors and the orientation of the barrel from the accelerometer;
      use the timestamps corresponding with each projectile to determine a velocity of each projectile; and
      send velocity data regarding the velocity of each projectile and the orientation of the barrel to the mobile computing device; and
   wherein the mobile computing device is configured to:
      receive the velocity data and the orientation of the barrel from the processor module;
      display the velocity data to a user of the firearm; and
      analyze the velocity data and the orientation of the barrel to aid the user in adjusting a scope of the firearm.

2. The chronograph system of claim 1, further comprising a heat sensor coupled to the frame and configured to gather temperature data about the barrel, wherein the mobile computing device is configured to use the temperature data to aid the user in adjusting the scope of the firearm.

3. The chronograph system of claim 1, further comprising a counter configured to record a number of activations of the firearm.

4. The chronograph system of claim 1, wherein the frame comprises a muzzle brake configured to decrease a recoil of the firearm after an activation of the firearm.

5. The chronograph system of claim 1, wherein the frame is configured to threadedly couple with the barrel of the firearm.

6. A chronograph system, comprising:
   a frame configured to removably couple to a barrel of a firearm;
   at least two sensors attached to the frame, wherein a first sensor of the at least two sensors is separated from a second sensor of the at least two sensors and each sensor of the at least two sensors is configured to detect a projectile and record a timestamp as the projectile passes each respective sensor;
   an accelerometer attached to the frame and configured to track an orientation of the barrel; and a processor module coupled to the frame and communicatively coupled to the at least two sensors and to the accelerometer, wherein the processor module is configured to:
  receive timestamps from the at least two sensors and the orientation of the barrel from the accelerometer;
  use the timestamps corresponding with each projectile to determine a velocity of each projectile; and
  analyze velocity data based on the velocity of each projectile and the orientation of the barrel to aid a user of the firearm in adjusting a scope of the firearm.

7. The chronograph system of claim 6, wherein the at least two sensors are optical sensors.

8. The chronograph system of claim 6, wherein the first sensor of the at least two sensors is separated from the second sensor of the at least two sensors by at least three inches.

9. The chronograph system of claim 6, wherein the accelerometer is configured to automatically turn on the chronograph system when a movement of the chronograph system is detected and automatically turn off the chronograph system when no movement of the chronograph system is detected over a predetermined length of time.

10. The chronograph system of claim 6, wherein the frame comprises a muzzle brake configured to decrease a recoil of the firearm after an activation of the firearm.

11. The chronograph system of claim 6, wherein the frame is configured to threadedly couple with the barrel of the firearm.

12. A chronograph system, comprising:
a frame configured to removably couple to a barrel of a firearm;
at least two sensors attached to the frame, wherein each sensor of the at least two sensors is configured to detect a projectile as the projectile passes each respective sensor;
a processor module coupled to the frame and communicatively coupled to the at least two sensors, wherein the processor module is configured to:
  receive data regarding each projectile from the at least two sensors; and
  use the data corresponding with each projectile to determine a velocity of each projectile and create velocity data based on the velocity of each projectile; and
a mobile computing device configured to communicatively couple to the processor module and display the velocity data to a user of the firearm.

13. The chronograph system of claim 12, wherein the frame is configured to threadedly couple with the barrel of the firearm.

14. The chronograph system of claim 12, wherein the chronograph system is configured to analyze the velocity data to aid a user of the firearm in adjusting a scope of the firearm.

15. The chronograph system of claim 12, wherein a first sensor of the at least two sensors is separated from a second sensor of the at least two sensors by at least three inches.

16. The chronograph system of claim 12, wherein the at least two sensors are optical sensors.

17. The chronograph system of claim 12, further comprising an accelerometer attached to the frame and configured to track an orientation of the barrel.

18. The chronograph system of claim 17, wherein the orientation of the barrel is used in conjunction with the velocity data to aid a user of the firearm in adjusting a scope of the firearm.

19. The chronograph system of claim 17, wherein the accelerometer is configured to automatically turn on the chronograph system when a movement of the chronograph system is detected and automatically turn off the chronograph system when no movement of the chronograph system is detected over a predetermined length of time.

* * * * *